United States Patent
Bai et al.

(10) Patent No.: US 8,676,920 B2
(45) Date of Patent: Mar. 18, 2014

(54) INTELLIGENT CACHE MANAGEMENT PROTOCOL FOR VEHICULAR NETWORKS

(75) Inventors: Fan Bai, Ann Arbor, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 640 days.

(21) Appl. No.: 12/963,332

(22) Filed: Dec. 8, 2010

(65) Prior Publication Data
US 2012/0151073 A1 Jun. 14, 2012

(51) Int. Cl.
*G06F 15/16* (2006.01)

(52) U.S. Cl.
USPC .......................... 709/214; 709/205; 709/228

(58) Field of Classification Search
USPC .......................... 709/228, 205, 214
See application file for complete search history.

(56) References Cited

U.S. PATENT DOCUMENTS

| | | | |
|---|---|---|---|
| 7,457,676 B1 * | 11/2008 | Sutardja et al. | 700/94 |
| 7,840,178 B2 * | 11/2010 | Hellman | 455/3.02 |
| 8,300,564 B2 * | 10/2012 | Grimm et al. | 370/310 |
| 8,542,636 B2 * | 9/2013 | Qiu et al. | 370/328 |
| 8,565,963 B2 * | 10/2013 | Burke, Jr. | 701/33.4 |
| 2002/0087797 A1 * | 7/2002 | Adrangi | 711/133 |
| 2004/0068363 A1 | 4/2004 | Goto | |
| 2004/0230370 A1 * | 11/2004 | Tzamaloukas | 701/200 |
| 2006/0004600 A1 * | 1/2006 | Summer et al. | 705/1 |
| 2007/0014536 A1 * | 1/2007 | Hellman | 386/94 |
| 2008/0207200 A1 | 8/2008 | Fein et al. | |
| 2009/0279462 A1 | 11/2009 | Luo et al. | |
| 2010/0077094 A1 | 3/2010 | Howarter et al. | |
| 2010/0115031 A1 * | 5/2010 | Lin et al. | 709/204 |
| 2010/0138856 A1 * | 6/2010 | Anglin, Jr. | 725/30 |
| 2010/0217869 A1 * | 8/2010 | Esteban et al. | 709/226 |
| 2011/0028178 A1 * | 2/2011 | Brady, Jr. et al. | 455/517 |
| 2011/0164562 A1 * | 7/2011 | Qiu et al. | 370/328 |
| 2012/0078497 A1 * | 3/2012 | Burke, Jr. | 701/300 |
| 2012/0270567 A1 * | 10/2012 | Johnson | 455/456.3 |

FOREIGN PATENT DOCUMENTS

| | | | |
|---|---|---|---|
| JP | 2002-213977 A | 7/2002 | |
| JP | 2005-063234 A | 3/2005 | |

* cited by examiner

*Primary Examiner* — Douglas Blair
(74) *Attorney, Agent, or Firm* — John A. Miller; Miller IP Group, PLC

(57) ABSTRACT

A method and system for cooperatively caching digital content in a vehicle for sharing with other vehicles in a vehicle-to-vehicle network. A content utility value is assigned to each piece of digital content available on the network, where the utility value is a function of the popularity of the content, the freshness of the content, and the size of the content. Any piece of content with a sufficiently high content utility value is stored in a host vehicle's collective cache, so that other vehicles may be able to retrieve it quickly on demand. The host vehicle may cache a particular piece of digital content even if the host vehicle is not interested in it. The host vehicle periodically re-computes the content utility value for all digital content in the vehicle's cache to determine if any of the data should be evicted from the cache.

16 Claims, 2 Drawing Sheets

INTELLIGENT CACHE MANAGEMENT PROTOCOL FOR VEHICULAR NETWORKS

BACKGROUND OF THE INVENTION

1. Field of the Invention

This invention relates generally to cache storage of mobile digital content in a vehicular network and, more particularly, to a method and system of cache management in a vehicular network which computes a utility value for each piece of mobile digital content which a host vehicle encounters, uses the utility value to determine whether the piece of mobile digital content should be stored in the vehicle's cache, and periodically re-computes the utility value for all mobile digital content in the vehicle's cache to determine if any of the data should be evicted from the cache.

2. Discussion of the Related Art

Many modern vehicles include one or more wireless communication technologies, which can make the driving experience safer, more convenient, and more enjoyable for the driver and passengers of the vehicle. Among these, information and entertainment (or "infotainment") systems have become particularly popular. Built-in cellular phone systems can provide internet access, in addition to their traditional voice communication capabilities. Many vehicles also commonly include other wireless communication technologies, such as satellite-based driver assistance systems, and Dedicated Short Range Communications (DSRC) or Wireless Local Area Network (Wi-Fi) systems. DSRC is often used for vehicle-to-vehicle (V2V) and vehicle-to-infrastructure (V2I) networks, both for infotainment purposes and otherwise.

In the infotainment world, there are many different types of digital content available for consumption. These include audio files containing music or other audio content, video files containing movies or other video content, information broadcasts (often known as podcasts), map and software updates for onboard systems, and others. While the variety and availability of digital content is great, it can be time-consuming and expensive to retrieve content which is of interest to a vehicle's occupants, because the particular piece of digital content is often only available from a source server via the internet, and the internet can only be accessed via cellular link. Meanwhile, because of the popularity of V2V communications, there is a huge amount of latent mobile storage space and high-speed communication bandwidth. However, much of the mobile storage space and high-speed vehicle-to-vehicle communication bandwidth are unused, because there is no established framework for cooperatively storing and sharing digital content between nodes in a V2V network.

There is a need for a cooperative cache management protocol which can be used in vehicle-to-vehicle networks. Such a protocol would enable a vehicle to collaborate with other neighboring vehicles for local retrieval of digital content of interest—and would increase the speed with which participants in the V2V network can obtain digital content, and reduce cellular internet access costs for participants in the V2V network.

SUMMARY OF THE INVENTION

In accordance with the teachings of the present invention, a method and system are disclosed for cooperatively caching digital content in a vehicle for sharing with other vehicles in a V2V network. A content utility value is assigned to each piece of digital content available on the network, where the utility value is a function of the popularity of the content, the freshness of the content, and the size of the content. Any piece of content with a sufficiently high content utility value is stored in a host vehicle's collective cache, so that other vehicles may be able to retrieve it quickly on demand. The host vehicle may cache a particular piece of digital content even if the host vehicle is not interested in it. The host vehicle periodically re-computes the content utility value for all digital content in the vehicle's cache to determine if any of the data should be evicted from cache.

Additional features of the present invention will become apparent from the following description and appended claims, taken in conjunction with the accompanying drawings.

BRIEF DESCRIPTION OF THE DRAWINGS

FIG. 3 is a block diagram of a cache management system for use onboard the host vehicle of FIG. 1.

DETAILED DESCRIPTION OF THE EMBODIMENTS

The following discussion of the embodiments of the invention directed to an intelligent cache management protocol for vehicular networks is merely exemplary in nature, and is in no way intended to limit the invention or its applications or uses.

Wireless communication systems have become an important part of everyday life. Modern vehicles have embraced this trend by incorporating onboard wireless communication systems, and using these wireless systems to enhance the safety, comfort, and convenience of vehicle occupants. Integrated cell phones and satellite-based safety and information systems are common in many vehicles today. Vehicle-to-vehicle (V2V) and vehicle-to-infrastructure (V2I) networks are also becoming increasingly popular, using technologies such as Dedicated Short Range Communications (DSRC) and Wireless Local Area Network (Wireless LAN or Wi-Fi).

Dedicated Short Range Communications (DSRC) are one-way or two-way short-range to medium-range wireless communication channels specifically designed for automotive use. Regulatory authorities in the United States, Europe, and elsewhere have allocated a bandwidth spectrum in the 5.9 GigaHertz (GHz) frequency band for DSRC, to be used by the Intelligent Transportation Systems (ITS) and for other purposes. DSRC can be used in both public safety and private operations, in V2V and V2I communication environments. DSRC is meant to be a complement to cellular communications by providing very high data transfer rates in circumstances where minimizing latency in the communication link within a localized communication zone is important.

Alternatively, standard Wi-Fi systems can be used in place of DSRC for many applications, with only a minor reduction in overall system performance. Wireless LAN (Wi-Fi) is a wireless communication technology based on the IEEE 802.11 standards. Wi-Fi operates generally on 2.4 GHz and 5.0 GHz frequency bands, and is used for many device to device applications—in homes, businesses, vehicles, and mobile devices. Including the newer multiple input/multiple output (MIMO) standard under 802.11n, Wi-Fi offers data rates comparable to DSRC.

V2V networks can be very beneficial in information and entertainment, or "infotainment" systems. In particular, V2V networks can be used to share digital content between nodes or vehicles in the V2V network, to be used in the vehicles' infotainment systems. Digital content may include audio files, video files, information broadcasts (often known as podcasts), map and software updates for onboard systems, and others types of data.

Figure 1:
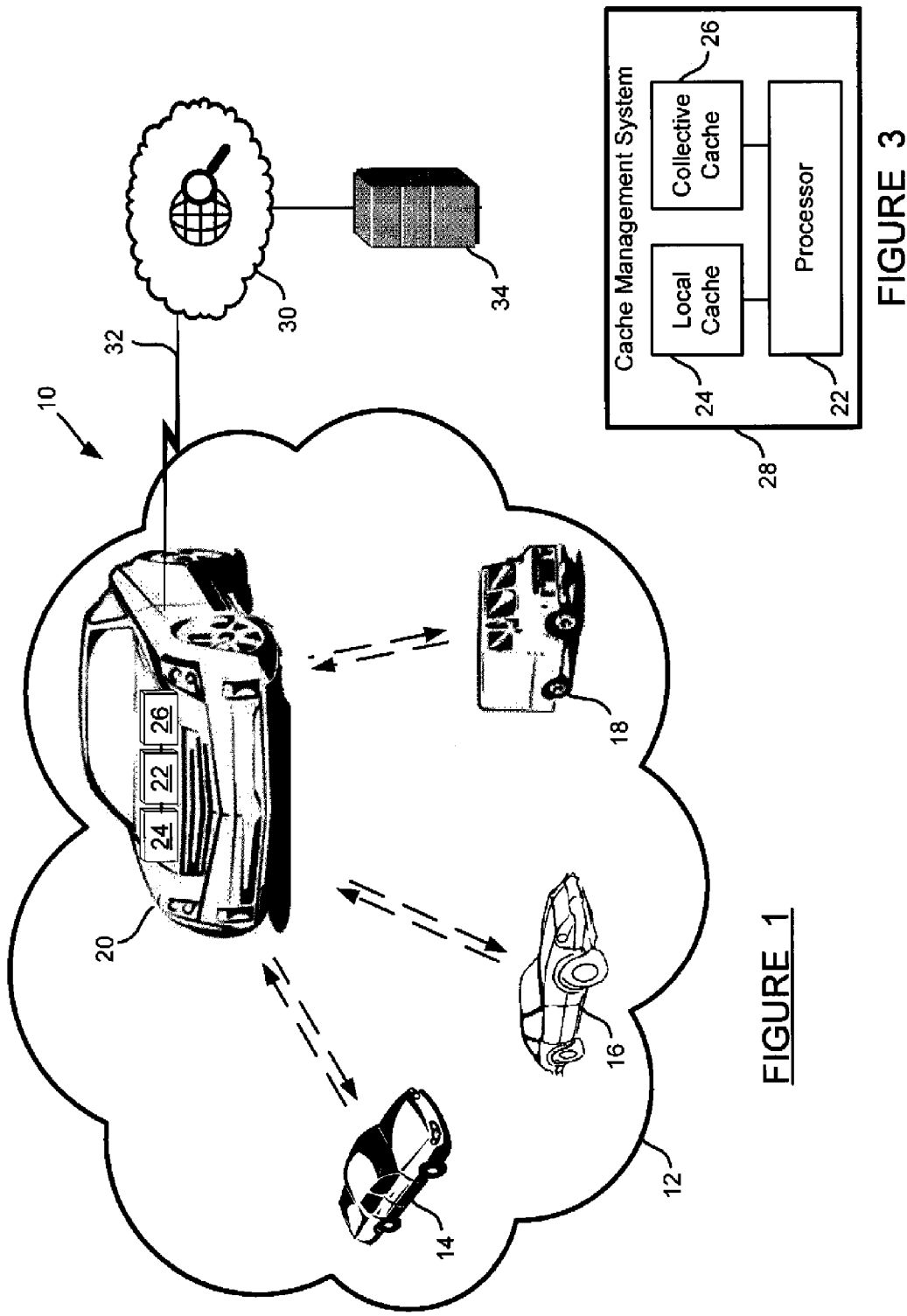
FIG. 1 is a schematic diagram of a vehicle communicating with other vehicles in a vehicle-to-vehicle network and accessing the internet via a cellular link.

FIG. 1 is a schematic diagram of a communication framework 10, including a V2V network 12. The V2V network 12 encompasses vehicles 14, 16, and 18, along with a host vehicle 20. The host vehicle 20 includes a processor 22, which communicates with a local cache 24 and a collective cache 26. The local cache 24 is used to store digital content which is of interest to an occupant of the host vehicle 20. The collective cache 26 is used to store digital content for societal sharing—that is, content which may not be of immediate interest to an occupant of the host vehicle 20, but is of high collective interest to other nodes in the V2V network. The processor 22 determines what to store in the local cache 24 and the collective cache 26, using logic that is discussed in detail below.

The host vehicle 20 can also access the internet 30 via a cellular communication link 32. From the internet 30, the host vehicle 20 can reach a server 34 to download any digital content of interest. However, using the cellular link 32 for data downloads may incur a cost to the occupant of the host vehicle 20. Furthermore, data communication rates via the cellular link 32 are much slower than those of either DSRC or Wi-Fi. Thus, there is a strong desire to use the fast, free, V2V network 12 as much as possible for digital content data sharing.

In order to make the V2V network 12 an effective tool for sharing digital content, it is desirable to make digital content as widely available as possible among vehicles in the V2V network 12, given the cache size limitations. The present invention provides a protocol for intelligently using available cache storage space, not only for digital content which is of interest to the occupants of the host vehicle 20, but also for digital content which is of relatively high interest to the collective population of all vehicles in the V2V network 12. Thus, any particular piece of digital content is more likely to be available upon demand by any vehicle in the V2V network 12.

To describe the intelligent cache management protocol, the interaction of the vehicle 14 with the host vehicle 20 will first be considered. Vehicles in the V2V network 12 continuously broadcast a beacon signal which announces an identification code. When the vehicle 14 encounters the host vehicle 20, after receiving each other's identification codes, a handshaking process is performed, in which a compressed content list summary is exchanged between the vehicle 14 and the host vehicle 20. The content list summary allows the host vehicle 20 to know what digital content is available from the vehicle 14, and vice versa. If the host vehicle 20 is interested in any digital content available from the vehicle 14, or vice versa, then a replication request is issued, and the digital content is transferred.

One purpose of the intelligent cache management protocol is to determine what digital content to request from other vehicles in the V2V network 12. Any digital content which is of interest to occupants of the host vehicle 20 will be stored in the local cache 24. All digital content in both the local cache 24 and the collective cache 26 is provided in the content list summary, and is available to other vehicles for replication. The question, answered by the intelligent cache management protocol, is what to store in the collective cache 26. This includes determining what newly discovered content should be replicated into the collective cache 26, and what existing content should be evicted from the collective cache 26.

To determine what to store in the collective cache 26, a Content Utility Value (CUV) is defined as a function of the popularity, freshness, and size of a piece of digital content. The popularity and the freshness of a piece of digital content are, in turn, functions of time. As an example, the CUV for a content $C_i$ could be defined as:

$$CUV_{C_i}(t) = \frac{P_{C_i}(t) \cdot F_{C_i}(t)}{100 \cdot S_{C_i}} \qquad (1)$$

Where $P_{C_i}(t)$ is the popularity of the content $C_i$ as a function of time t, $F_{C_i}(t)$ is the freshness of the content $C_i$ as a function of time t, and $S_{C_i}$ the size of the content $C_i$. In this example, the values of the popularity, the freshness, and the size can vary from 1 to 100. Other numeric ranges, and other equations, are possible for calculating the CUV. In all cases, the higher the CUV for a particular piece of digital content, the more likely that piece of digital content will be stored in the collective cache 26.

The values of the popularity, the freshness, and the size of each piece of digital content are carried as attributes with the digital content data file. The value of the size of a piece of content is, of course, constant. For example, a small data file may have a size value of 20, a medium data file may have a size value of 50, and a very large data file may have a size value of 100. The value of the popularity of a piece of content starts out at a low value, possibly 1, and is incremented at each designated time interval T if the piece of content was requested by another vehicle within the most recent time interval, up to a maximum value of 100. The value of the freshness of a piece of content starts out at a value of 100, and is decremented at the designated time interval T, down to a minimum value of 1. The increment value, the decrement value, and the time interval T may be sized to achieve the desired result. For example, the increment value and the decrement value may be defined as 1, and the time interval T could be defined as 1 day. Of course, many other effective combinations of the increment and decrement values, the time interval T, and the numeric ranges are possible.

Returning to the example from FIG. 1, when the host vehicle 20 receives the content list summary from the vehicle 14, the processor 22 in the host vehicle 20 must determine if any of the digital content from the vehicle 14 should be copied into the local cache 24 or the collective cache 26. If the host vehicle 20 is interested in a particular piece of content $C_i$, then the host vehicle 20 replicates the content $C_i$ from the vehicle 14 into the local cache 24. If the host vehicle 20 is not interested in the content $C_i$, then the host vehicle 20 must decide whether to copy the content $C_i$ into the collective cache 26, where it could be accessed by another vehicle in the V2V network 12, or where it may be retrieved into the local cache 24 if the host vehicle 20 later becomes interested in the content $C_i$.

In one example, in order to determine whether to copy the content $C_i$ into the collective cache 26, the content utility value $CUV_{C_i}(t)$, computed in Equation (1), is compared to a predefined storage threshold value K. If $CUV_{C_i}(t)$ exceeds the storage threshold K, then the content $C_i$ is considered to be of high enough collective interest that it is replicated into the collective cache 26; otherwise, the content $C_i$ is not cached. In another example, before being compared to the storage threshold K, the content utility value $CUV_{C_i}(t)$ is first divided by a version value $V_{C_i}$, where the version value is incremented every time the content $C_i$ is replicated at another vehicle. The purpose of the version value $V_{C_j}$ is to serve as an indicator of how widely available in the V2V network 12 a particular piece of digital content already is, and to gradually make a piece of content less attractive for further replication if it is already widely available.

The processor 22 must also manage the contents of the collective cache 26 by periodically evicting some contents. As discussed previously, the CUV is a function of time, in that the popularity value increases and the freshness value decreases over time. Therefore, the processor 22 must periodically calculate an updated CUV for each piece of content in the collective cache 26. According to the example discussed previously, at each time interval T, the popularity value $P_{C_j}$ is incremented by 1 if the content $C_i$ was requested by another vehicle within the time interval, and the freshness value $F_{C_j}$ decremented by 1. After calculating an updated CUV for each piece of content in the collective cache 26 at the time interval T, the processor 22 sorts the contents in order of decreasing CUV.

Two scenarios are envisioned for cache eviction. In one scenario, the collective cache 26 is essentially full, and a new high-value piece of content is to be added. In this scenario, the one or more pieces of content with the lowest CUV are evicted from the collective cache 26, in order to make room for the new high-value content. In the second scenario, after calculating an updated CUV for each piece of content at the time interval T, the processor 22 automatically evicts from the collective cache 26 any content which has a CUV less than a eviction threshold L. That is, any content with a CUV less than the eviction threshold L is deemed to be of low enough societal interest that it is not worth retaining in the collective cache 26.

Figure 2:
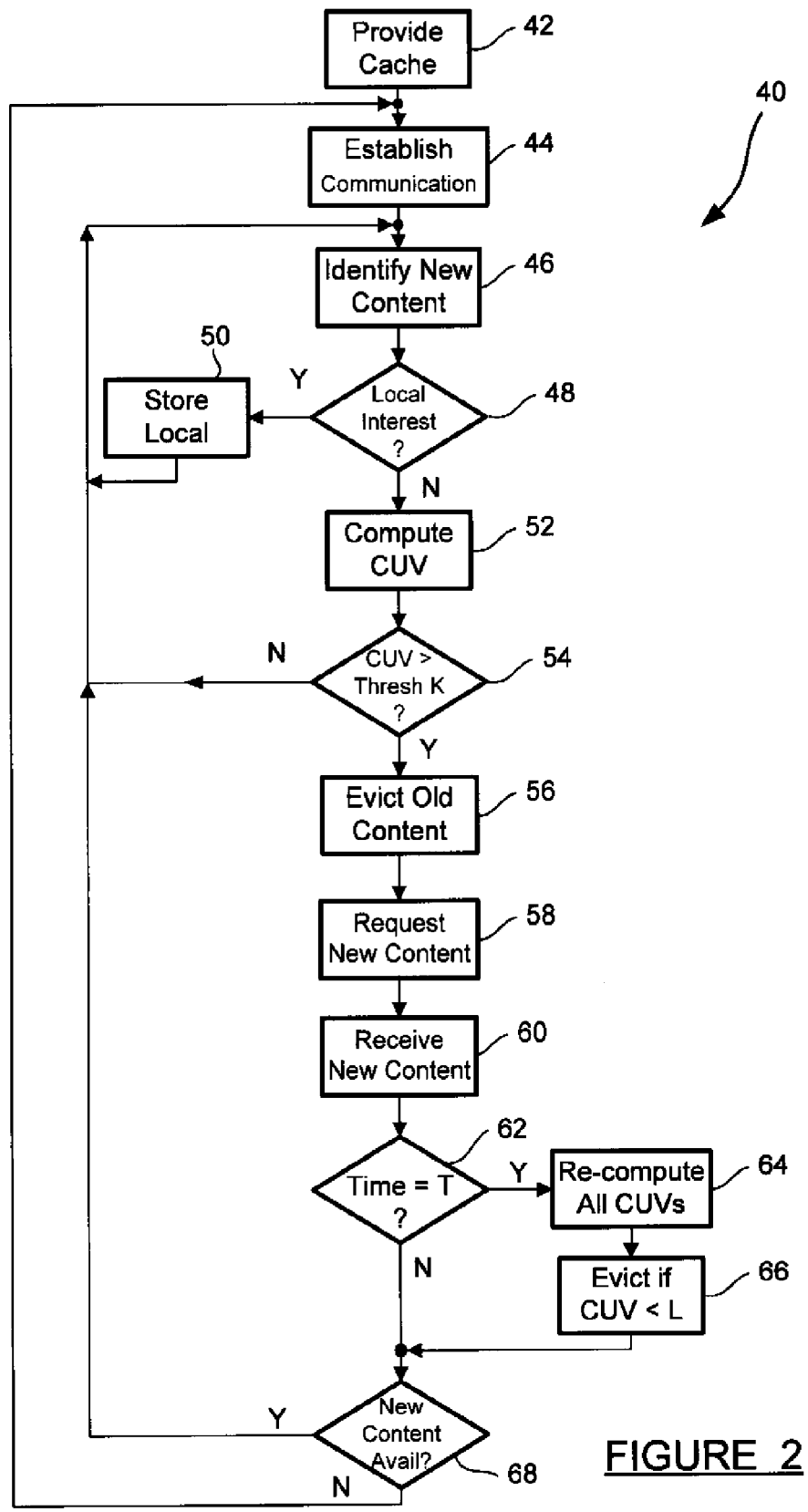
FIG. 2 is a flow chart diagram of a method that can be used by a host vehicle to determine whether to store a particular piece of digital content in an onboard cache, and whether to evict any of the digital content already contained in the cache.

FIG. 2 is a flow chart diagram 40 of a method that can be used to implement the intelligent cache management protocol described above. At box 42, the host vehicle 20 provides the local cache 24 and the collective cache 26, with the content utility value CUV computed for each piece of content. At box 44, the host vehicle 20 establishes communication with a vehicle in the V2V network, the vehicle 14 being the first example, and exchanges content list summaries. At box 46, the processor 22 identifies a newly discovered piece of digital content. At decision diamond 48, the processor 22 determines whether the digital content currently being evaluated is of local interest to the host vehicle 20. If it is, then the processor 22 stores the digital content in the local cache 24 at box 50, and the process returns to the next piece of digital content at the box 46.

If the host vehicle 20 is not interested in the digital content at the decision diamond 48, then the processor 22 computes a CUV for the new piece of digital content at box 52. The CUV can be computed at the box 52 using Equation (1), where the popularity, freshness, and size values are provided by the vehicle 14. At decision diamond 54, the processor 22 checks the CUV to determine if it exceeds the storage threshold value K. If it does not, then the digital content is not stored, and the process returns to the next piece of digital content at the box 46. If the CUV does exceed the storage threshold value K, then at box 56 the processor 22 determines if any content in the collective cache 26 must be evicted in order to make room for the new digital content, and evicts any old content as necessary. The determination at the box 56 is made based on the size of the new digital content file, and the CUV data about all content in the collective cache 26 provided at the box 42. At box 58, the processor 22 requests replication of the new digital content from the vehicle 14, and increments the version value V on both the vehicle 14 and the host vehicle 20. At box 60, the host vehicle 20 receives the new digital content and stores it in the collective cache 26.

At decision diamond 62, the processor 22 determines whether the time interval T has been reached. If the time interval T has been reached, then at box 64 the processor 22 re-computes the CUV for all content of the collective cache 26, with the popularity potentially incremented and the freshness decremented as discussed previously. At box 66, any content with an updated CUV less than the eviction threshold value L is evicted from the collective cache 26. The process continues at decision diamond 68, where the processor 22 determines whether or not any more new digital content is available from the vehicle 14. If so, then the process returns to the next piece of digital content at the box 46. If no more new content is available from the vehicle 14, then the process returns to the box 44 and the host vehicle 20 repeats the process steps of the boxes 44-68 for the vehicles 16 and 18, and any other vehicles it encounters in the V2V network 12.

FIG. 3 is a block diagram of a cache management system 28 for use onboard the host vehicle 20. The cache management system 28 includes the processor 22, the local cache 24 and the collective cache 26. As discussed above, the cache management system 28 communicates with other vehicles in the V2V network 12, both sharing content from the local cache 24 and the collective cache 26 with the other vehicles and copying new content from the other vehicles into the local cache 24 and the collective cache 26. The cache management system 28 can also receive content via the cellular link 32. The processor 22 determines what digital content to store in the local cache 24 and what content to store in the collective cache 26 according to the protocol discussed above.

Several different ways of partitioning total available cache space between the local cache 24 and the collective cache 26 are envisioned. A vehicle manufacturer could simply designate a fixed partitioning, a vehicle's owner or operator could designate a user-defined partitioning, or the partitioning could be dynamically adjusted so that the local cache 24 is sized to hold all user-requested content, and the collective cache 26 is sized as the remainder of the total available cache space.

It is important to recognize that the intelligent cache management protocol described above uses only locally measured data to make decisions about content caching and eviction. The protocol does not require global knowledge or coordination among vehicles. This is very desirable, as it eliminates a significant barrier to adoption, and also allows the protocol to be implemented with different vehicles using different parameters for content utility value, different eviction criteria, and so forth, while still achieving the objective of making popular digital content widely available in the V2V network 12.

When an occupant of the host vehicle 20 wishes to consume a piece of digital content which is not available in either the local cache 24 or the collective cache 26, the processor 22 checks the content lists of all of the vehicles in the V2V network 12. As shown in FIG. 1, this includes the vehicles 14, 16, and 18. However, in reality, in many urban driving situations, hundreds of vehicles may be in the V2V network 12 of the host vehicle 20 at any particular time. If there are a large number of vehicles in the V2V network 12, and a significant portion of the vehicles are using an intelligent cache management protocol with collective cache allocation, there is a high likelihood that the host vehicle 20 will find the piece of digital content it is looking for in the V2V network 12. If not, the host vehicle 20 can retrieve the desired digital content from the server 34 via the internet 30 and the cellular link 32—although this approach will be slower than the vehicle-to-vehicle approach, and may incur communication costs.

In order to maximize the effectiveness of the intelligent cache management protocol, it is suggested that vehicles with strong social-mobility behavior allocate a large portion of their cache for collective sharing. For example, the vehicle 18, a delivery truck, likely spends a majority of the day on the road, thus encountering a large number of vehicles in the V2V network 12 on a daily basis. The vehicle 18 can allocate a large portion of its cache for collective sharing of digital content, and further increase the likelihood of any vehicle finding a particular piece of content in the V2V network 12.

It is also possible to include vehicle-to-infrastructure (V2I) or vehicle-to-pedestrian components in the intelligent cache management protocol. Very simply, pedestrians, cyclists, buildings and other structures in high-traffic areas can contain a DSRC or Wi-Fi transceiver, and participate in the collective sharing of digital content using the utility evaluation methodology described above. Infrastructure components may be able to allocate a large amount of cache space to collective sharing, thus providing a significant boost to the availability of popular digital content in the V2V network 12.

Using the collective cache management protocol described above, performance can be improved and cellular communication costs avoided for users wishing to download digital content. Furthermore, there are no increased communication or hardware costs for the host vehicle 20, and bandwidth resources are conserved in both the V2V network 12 and the cellular link 32. These improvements are good for both the occupants of the host vehicle 20 individually, as well as the collective good of the occupants of all other participating vehicles.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for managing digital content data in a vehicle's cache, said method comprising:
providing a local cache and a collective cache in a host vehicle, where the local cache is used to store digital content data files that are of interest to occupants of the host vehicle, and the collective cache is used to store digital content data files for sharing with other vehicles;
establishing communication with another vehicle by the host vehicle, and receiving a digital content summary list from the other vehicle;
identifying a new piece of digital content from the summary list;
determining if the new piece of digital content is of interest to occupants of the host vehicle and, if the new piece of digital content is of interest to occupants of the host vehicle, requesting replication of the new piece of digital content, receiving the new piece of digital content from the other vehicle, and storing the new piece of digital content in the local cache;
calculating a content utility value for the new piece of digital content if it was not stored in the local cache, and comparing the content utility value to a storage threshold value, where calculating a content utility value includes using an equation containing a popularity value, a freshness value, and a size value, and where the popularity value, the freshness value, and the size value are received from the other vehicle;
determining if the content utility value for the new piece of digital content exceeds the storage threshold value; and
requesting replication of the new piece of digital content, receiving the new piece of digital content from the other vehicle, and storing the new piece of digital content in the collective cache, if the content utility value for the new piece of digital content exceeds the storage threshold value.

2. The method of claim 1 wherein establishing communication with another vehicle by the host vehicle includes using a vehicle-to-vehicle network.

3. The method of claim 2 wherein the vehicle-to-vehicle network uses one or more Dedicated Short Range Communications channels or Wireless Local Area Network communication channels.

4. The method of claim 1 further comprising determining if a predetermined time interval has elapsed and, if the time interval has elapsed, incrementing the popularity value for each of the digital content data files which have been requested by another vehicle, decrementing the freshness value for each of the digital content data files, and re-computing the content utility value for each of the digital content data files in the collective cache.

5. The method of claim 4 further comprising evicting from the collective cache any of the digital content data files for which the content utility value after re-computing is less than an eviction threshold value.

6. The method of claim 1 wherein storing the new piece of digital content in the collective cache includes evicting from the collective cache any of the digital content data files necessary to make room in the collective cache for the new piece of digital content.

7. The method of claim 6 wherein evicting from the collective cache any of the digital content data files includes evicting the digital content data files with the lowest content utility value.

8. The method of claim 1 wherein determining if the content utility value for the new piece of digital content exceeds the storage threshold value includes dividing the content utility value by a version value.

9. The method of claim 8 further comprising incrementing the version value each time the new piece of digital content is replicated.

10. A method for managing digital content data in a vehicle's cache, said method comprising:
providing a local cache and a collective cache in a host vehicle, where the local cache is used to store digital content data files that are of interest to occupants of the host vehicle, and the collective cache is used to store digital content data files for sharing with other vehicles;
establishing communication with another vehicle in a vehicle-to-vehicle network by the host vehicle, and receiving a digital content summary list from the other vehicle;
identifying a new piece of digital content from the summary list;
determining if the new piece of digital content is of interest to occupants of the host vehicle and, if the new piece of digital content is of interest to occupants of the host vehicle, requesting replication of the new piece of digital content, receiving the new piece of digital content from the other vehicle, and storing the new piece of digital content in the local cache;
calculating a content utility value for the new piece of digital content if it was not stored in the local cache, and comparing the content utility value to a storage threshold value, where the content utility value is calculated using an equation containing a popularity value, a freshness value, and a size value;

determining if the content utility value for the new piece of digital content exceeds the storage threshold value; and requesting replication of the new piece of digital content, receiving the new piece of digital content from the other vehicle, and storing the new piece of digital content in the collective cache, if the content utility value for the new piece of digital content exceeds the storage threshold value.

11. The method of claim 10 further comprising determining if a predetermined time interval has elapsed and, if the time interval has elapsed, incrementing the popularity value for each of the digital content data files which have been requested by another vehicle, decrementing the freshness value for each of the digital content data files, re-computing the content utility value for each of the digital content data files in the collective cache, and evicting from the collective cache any of the digital content data files for which the content utility value after re-computing is less than an eviction threshold value.

12. The method of claim 10 wherein storing the new piece of digital content in the collective cache includes evicting from the collective cache any of the digital content data files necessary to make room in the collective cache for the new piece of digital content, where the digital content data files with the lowest content utility value are evicted.

13. The method of claim 10 wherein determining if the content utility value for the new piece of digital content exceeds the storage threshold value includes dividing the content utility value by a version value.

14. A cache management system for a host vehicle in a vehicle-to-vehicle network, said system comprising:

a local cache module;

a collective cache module; and a processor configured to receive digital content summary lists from other vehicles in the vehicle-to-vehicle network, identify new pieces of digital content from the summary lists, replicate and store in the local cache module any of the new pieces of digital content which are of interest to the occupants of the host vehicle, and replicate and store in the collective cache module any of the new pieces of digital content which are considered to be of interest to the other vehicles in the vehicle-to-vehicle network, where the processor is configured to compute a content utility value for each of the new pieces of digital content, compare the content utility value to a storage threshold value, and store in the collective cache the new pieces of digital content for which the content utility value exceeds the storage threshold value, and where the content utility value is a function of a popularity value, a freshness value, and a size value for each of the new pieces of digital content, and the popularity value, the freshness value and the size value are received from the other vehicles.

15. The cache management system of claim 14 wherein the processor is configured to re-compute the content utility value for each of the digital content data files in the collective cache at a predefined time interval using updated values of the popularity value and the freshness value, and evict from the collective cache any of the digital content data files with a content utility value less than an eviction threshold value.

16. The cache management system of claim 14 wherein the vehicle-to-vehicle network uses one or more Dedicated Short Range Communications channels or Wireless Local Area Network communication channels.

* * * * *